J. MAGNUS.
ADDING MACHINE.
APPLICATION FILED APR. 4, 1913.

1,270,855.

Patented July 2, 1918.
7 SHEETS—SHEET 2.

Attest:
Wm H Scott
R. M. Lawrence

Inventor:
John Magnus,
by J. D. Rippey, Atty.

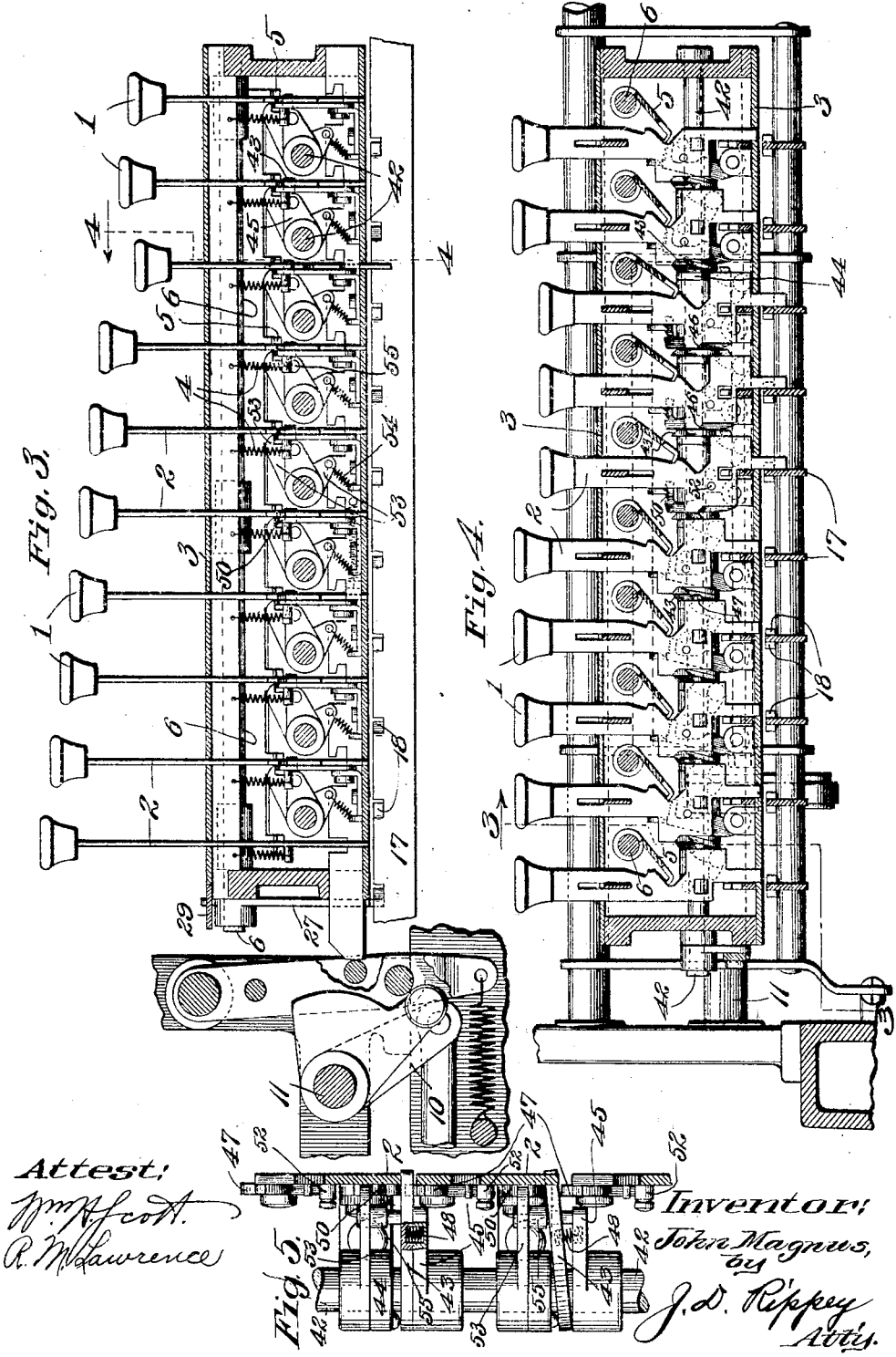

J. MAGNUS.
ADDING MACHINE.
APPLICATION FILED APR. 4, 1913.
1,270,855.
Patented July 2, 1918.
7 SHEETS—SHEET 4.
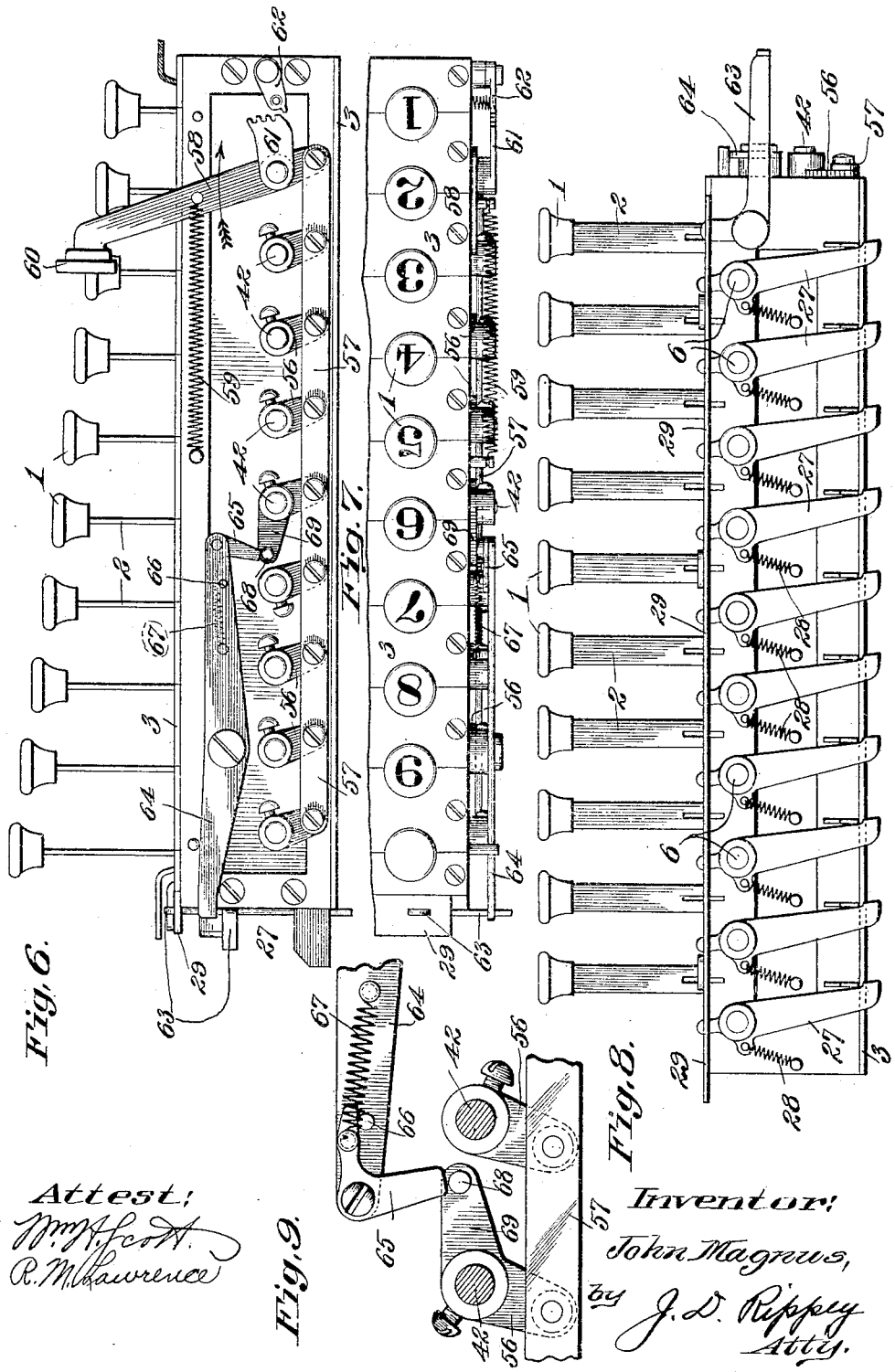

J. MAGNUS.
ADDING MACHINE.
APPLICATION FILED APR. 4, 1913.

1,270,855.

Patented July 2, 1918.
7 SHEETS—SHEET 5.

Attest:
Wm H Scott
R. M Laurence

Inventor:
John Magnus,
by J. D. Rippey,
Atty.

J. MAGNUS.
ADDING MACHINE.
APPLICATION FILED APR. 4, 1913.
1,270,855.
Patented July 2, 1918.
7 SHEETS—SHEET 6.
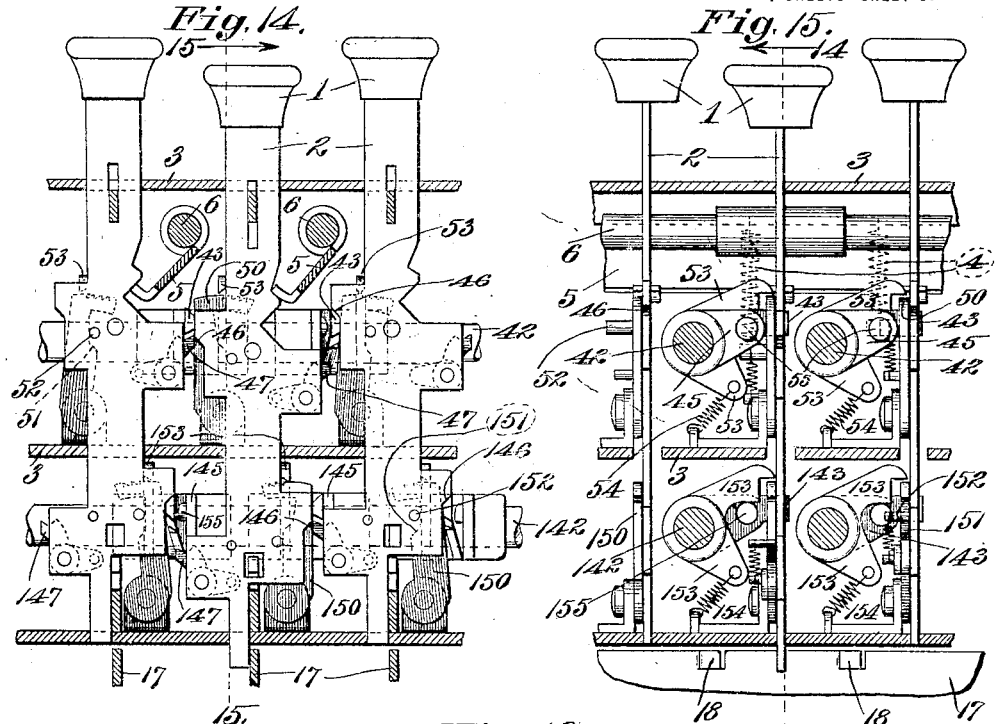
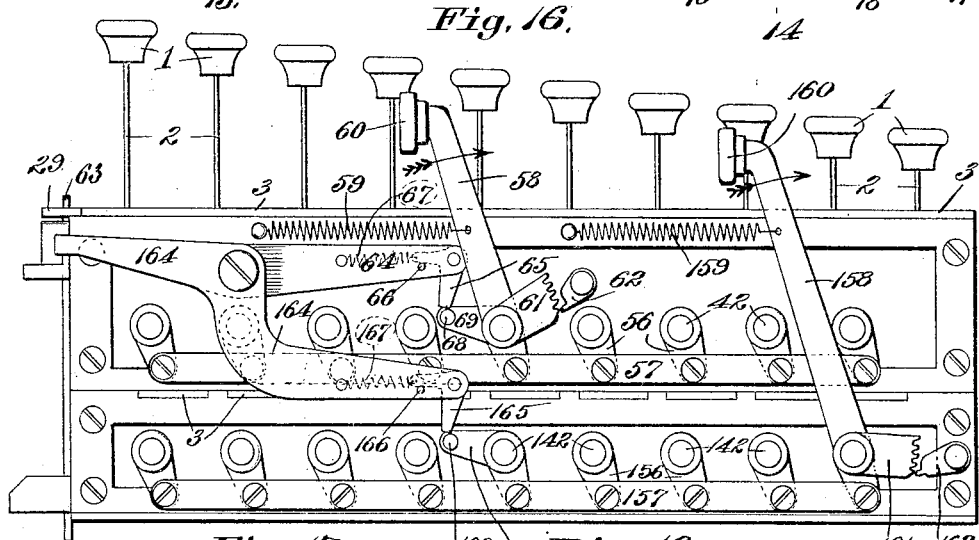
Attest,
Wm. F. Scott
R. M. Lawrence
Inventor:
John Magnus,
by
J. D. Rippey
Atty.

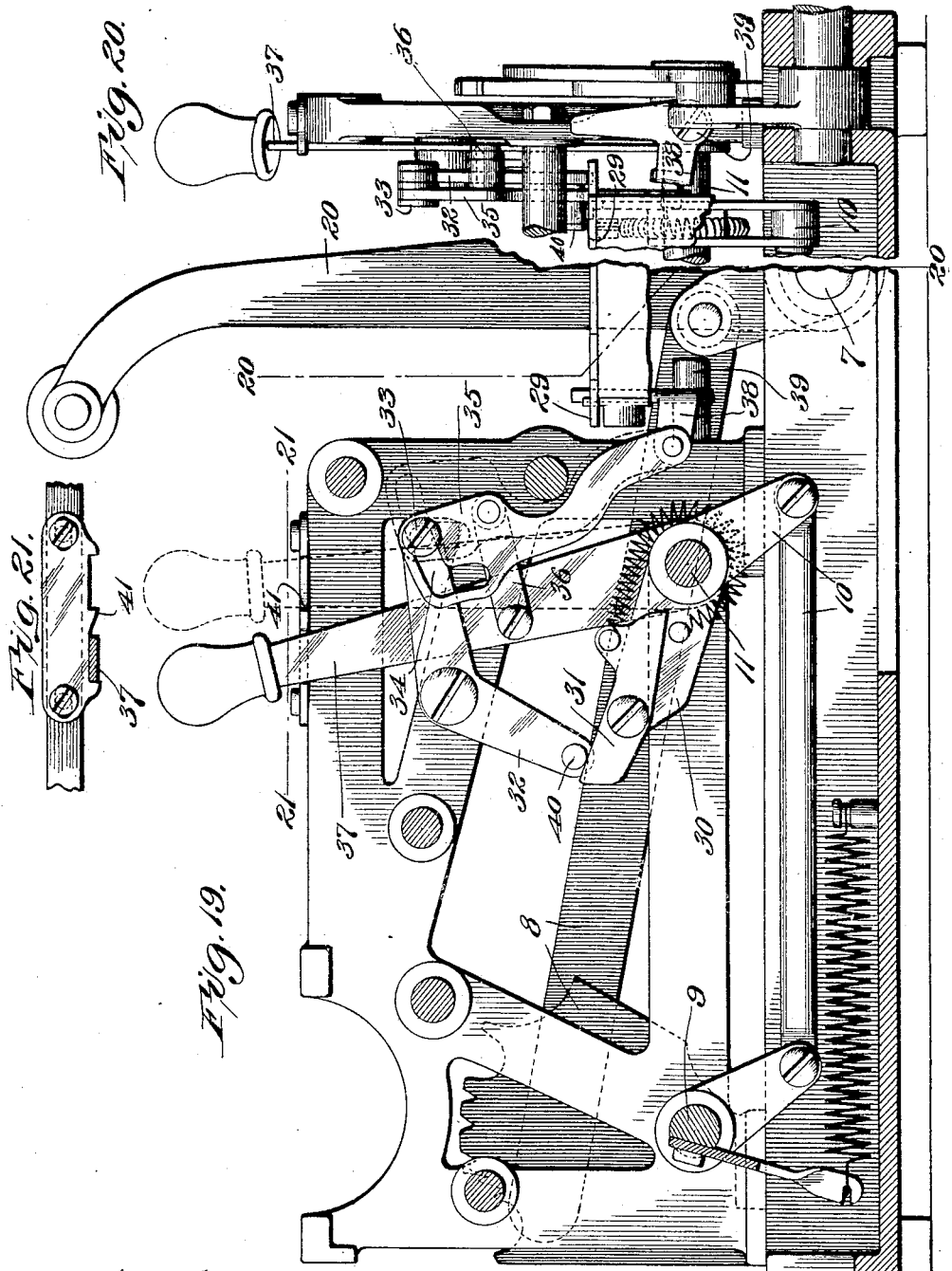

UNITED STATES PATENT OFFICE.

JOHN MAGNUS, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING-MACHINE.

1,270,855.　　　　Specification of Letters Patent.　　Patented July 2, 1918.

Application filed April 4, 1913. Serial No. 758,848.

*To all whom it may concern:*

Be it known that I, JOHN MAGNUS, a citizen of the United States, residing at Poplar Bluff, in the county of Butler and State of Missouri, have invented new and useful Improvements in Adding-Machines, of which the following is a specification enabling those skilled in the art to which my invention appertains to understand the same.

My present invention relates to adding and computing machines of that type which include denominational rows of keys for various numerical orders; that is, there is a row of keys for units order, another row of keys for tens order, another row of keys for hundreds order, and so on to the extent of the capacity of the machine for adding items. In the machines to which my present invention relates, the numbers to be added are set up or registered on the keys by depressing the keys corresponding to the digits of the number, care being exercised in every instance so that the keys of only the proper orders are pressed in order that the number may be accurately set up or represented by the said keys.

These machines are known commercially, and referred to as, "machines of the full key-board type", in distinction from other machines which do not employ a set or row of keys for each numerical order.

These machines include adding wheels arranged in numerical orders and suitable mechanism for operating the adding wheels to add the numbers set up or represented by the keys. These machines are also equipped with recording mechanism whereby the items may be recorded, and the recording and adding mechanisms are correlated so that the adding mechanism is operated incidentally to the operation of the recording mechanism.

In the present instance I have shown my invention embodied with the Pike adding machine, of which many of the essential parts are shown and described in Patents #763,692, of June 28, 1904, and 767,596 of August 16, 1904. These machines have a row of keys containing nine keys for each denominational or numerical order within the capacity of the machine. In operating the machines to list and add, the keys are depressed to represent the number to be listed and added, after which the adding and listing mechanism are actuated one or more times to add and list the number one or more times as desired. The keys and key set devices in these machines return to normal position after the number represented thereby has been added as many times as desired, and the machine is then ready to receive and add another number. The machines are also equipped with a repeat device for rendering inoperative the devices for returning the keys, so that a number may be repeatedly added as many times as desired on one setting of the keys.

Multiplication or extension has been effected on these machines by successive or repeated addition of the number set or represented on the keys as aforesaid. For instance, the number "951" may be multiplied by "245" by setting the keys in the proper orders to represent the number "951", then operating the adding mechanism five times which produces the result of multiplication by the "5" of the number "245" and clearing the key-board, by which is meant, returning the keys to idle position. Next the keys in thousands, hundreds and tens orders corresponding to the digits of the number "951" would be set, thereby potentially multiplying the number by ten, after which adding mechanism would be operated four times which produces the result of multiplication by "4" in tens order, and clearing the key-board; and finally by setting the corresponding keys in tens of thousands, thousands and hundreds orders, thereby potentially multiplying the number by one hundred, after which the adding mechanism would be operated two times producing the result of multiplication by the "2" in hundreds order, and clearing the key-board, when the operation is complete. The number added in the adding mechanism, after these operations in the example now being considered, is "232995" the correct result of multiplying one of two numbers by the other.

It will be noted from the foregoing that, after completing the multiplication by each digit, it is necessary manually to set the keys in higher orders in preparation for multiplying by the digits in higher orders of the multiplier number This frequently results in error in operating the keys, which error, in some instances, may remain undetected in time for correction to prevent error in the final result. This has restricted the utility of these machines and, in many instances, they constitute no appreciable aid in mathematical calculations.

The object of my present invention is to produce an improved equipment for machines of the full keyboard type whereby the numbers set on the keys may be stepped mechanically from order to order to effect the potential multiplication above described.

Another object is to provide an equipment whereby the number may be stepped on the key-board for potential multiplication as above described or toward lower orders for all purposes useful in mathematical calculations.

There are other objects and advantages to be attained by my invention, all of which will appear from the following detailed description, reference being made to the accompanying drawings in which—

Fig. 3 is a sectional view on the line 3—3 of Fig. 1, which line is also shown in Fig. 4.

Fig. 4 is a sectional view on the line 4—4 of Fig. 1 which line is also shown in Fig. 3.

Fig. 5 is a detail plan or top view of the mechanism included in my invention for effecting depression of the keys in different rows under control of previously depressed keys of corresponding value in adjacent rows depressed in a preceding operation.

Fig. 6 is a side elevation of the key-board showing the connections for operating the elements which effect depression of the keys in the different rows under control of previously depressed keys of corresponding value in adjacent rows.

Fig. 7 is a plan view of a part of the key-board showing the connections illustrated in Fig. 6.

Fig. 8 is a view of the rear or inner end of the key-board showing the arrangement of the levers whereby the depressed keys are released.

Fig. 9 is an enlarged detail view of the devices operated by the connections which effect depression of keys in different rows of corresponding value to keys in adjacent rows previously depressed; said devices illustrated in Fig. 9 being effective to release the previously depressed keys while effecting depression of keys of corresponding value in adjacent rows.

Fig. 14 is a sectional view illustrating devices for stepping the number in both directions on the key-board, said view being approximately on the line 14—14 of Fig. 15.

Fig. 15 is a sectional view substantially on the line 15—15 of Fig. 14.

Fig. 16 is a side elevation of the key-board containing the devices for stepping the number in either direction, that is, toward higher orders or toward lower orders at the will of the operator; said view corresponding to Fig. 6.

Figs. 17 and 18 are plan or top views of the key-depressing devices embodied in Figs. 14 and 15.

Fig. 19 is a detail view of the repeat mechanism of the adding machine in which I have illustrated my invention.

Fig. 20 is a view substantially on the line 20—20 of Fig. 19.

Fig. 21 is a detail view of the latch device for holding the repeat lever of the machine in its different adjustments, said view being approximately on the line 21—21 of Fig. 19.

Figure 2:
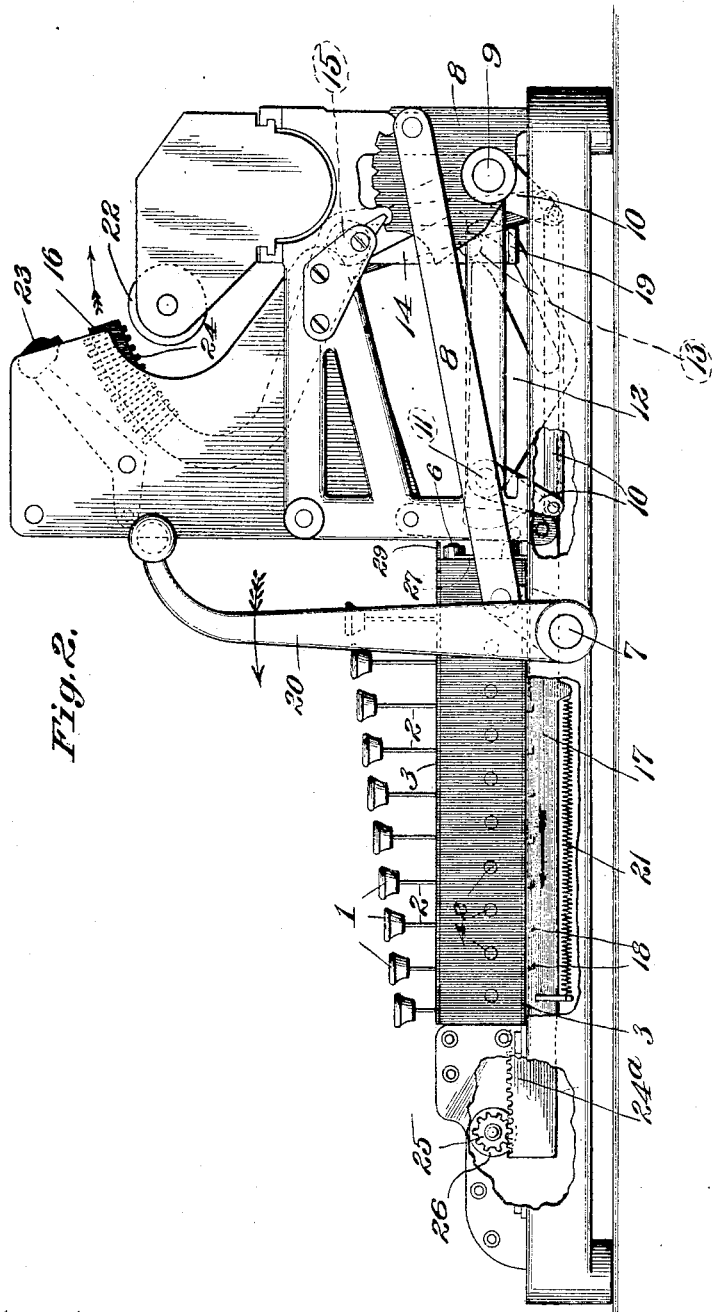
Fig. 2 is a side elevation of the machine with the case removed, and portions of the frame-work broken away in order to disclose working parts of the machine.

The denominational rows of depressible keys 1 are supported upon stems 2 which are guided in slots in the key-board plates 3. The keys are actuated upwardly to idle position by springs 4 (Fig. 3) which connect the stems of the keys with stationary elements in the key-board frame. In the particular embodiment illustrated the key stems, when depressed become engaged by latches 5 carried on bars 6, one of which extends parallel with each denominational row of keys, in the manner shown in Figs. 4 and 14. A rock-shaft 7 (Figs. 2 and 19) has a train of connections 8 leading to a rock-shaft 9 from which connections 10 lead to a rock-shaft 11. A slotted plate 12 on the shaft 11 operatively engages a rod 13 carried by depending arms 14 which swing from a shaft 15. The arcuate type-carriers 16 are pivoted on the shaft 15, and extend below said shaft terminating alongside of corresponding bars 17. The lower end of the type-carriers are connected to corresponding bars 17, one of which extends adjacent to, but in a plane below, the lower ends of the key stems 2. Thus there is one type-carrier 16, and likewise one bar 17, for each denominational row of keys. Each bar 17 is provided with a series of lateral projections 18, adapted to engage the lower ends of the key stems when the key stems are depressed, to limit movement of the type-carriers and the bars 17. The lower ends of the arms 14 support a transverse bar 19 which normally engages in front of the lower extremities of the type-carriers 16 and thereby holds the type-carriers in their normal positions. When the shaft 7 is rocked, through operation of the operating handle 20, or otherwise, the bar 19 is drawn forwardly by operation of the slotted plate 12 through the connections from the rock shaft 7, and the type-carriers corresponding to the denomination rows in which keys are depressed are free to move, and are moved by springs 21, until stopped by engagement of the tongues or projections 18 with the lower ends of the key stems which had been depressed. This permits the springs 21 to cause the bars 17 to move the type-carriers to position the type thereon corresponding in value to the keys depressed, adjacent to the writing line over the platen 22. Hammers 23, of known arrangement and operation, are arranged to drive the type 24 alined at the printing line of the platen, to record the number represented by the alined type, which is also the number represented by the keys depressed. The front ends of the bars 17 are provided with racks 24ª arranged to operate the adding pinions 25, to add the numbers represented by the keys and recorded as aforesaid. The pinions 25 carry dials 26 which are visible through a sight slot near the front of the case, and which constitute means for visibly indicating the sum of numbers added, or the product of numbers multiplied, or the remainder of numbers subtracted or the quotient of numbers divided.

The keys which had been depressed, and which had been latched in their depressed adjustment by the latches 5, may be automatically released and restored to idle position incidentally to the listing or adding of the number represented by said depressed keys. The rear end of each of the bars 6 carries a lever 27 (Fig. 8) and said levers are actuated by springs 28 effectively to cause the latches 5 to engage with the key stems 2. The upper ends of the levers 27 project through slots in a sliding plate 29, so that movement of said plate 29 in one direction will rock all of the bars 6 and release the latches 5 from all of the key stems which had been depressed, and permit said key stems to be returned to idle position by their springs 4. The shaft 11, which is rocked by the operation of the rock shaft 7, carries an arm 30 (Fig. 19) upon which is pivoted a member 31. A bell crank lever 32 is pivoted to the frame of the machine above the member 31 and has a projection 33 extending into an angular slot 34 formed in a plate 35 which is supported on an arm 36 attached to the "repeat" lever 37, the latter being pivotally mounted upon the shaft 11. The lower end of the plate 35 is pivotally connected to one arm of the bell-crank lever 38 mounted on a support 39, and having one arm adjacent to the end of the sliding plate 29. When the shaft 11 is rocked to raise the member 31, which occurs on the forward movement of the lever 20, said member 31 rises above a projection 40 on the lower end of the bell-crank lever 32. On downward movement the lower edge of the member 31 engages against the projection 40 and depresses the forward end of the lever 32, thereby operating the lever 38 to move the plate 29 laterally, which operates all of the bars 6 to release the latches 5 from the key stems which had been depressed and latched down. The "repeat" lever 37 is capable of two adjustments, in one of which the keys are released at each recording or adding operation as above described; and in the other of which the key releasing connections are disabled, so that the keys which had been depressed and latched down are not released, thereby enabling the operator to "repeat" the number represented by said keys. In the adjustment shown in Figs. 19 and 21 the "repeat" lever is adjusted to permit release of the keys at each adding or listing operation; but by moving the lever 37 to engage in front of the shoulder 41 (Fig. 21) the projection 33 assumes a position in the vertical part of the angular slot 34, so that the lever 32 may be operated without operating the plate 35, and therefore, without operating the lever 38, thereby enabling the adding or listing operation to be performed without releasing the keys which had been depressed.

I have adapted my present invention to the mechanism above described, and my invention includes means under control of the keys for effecting depression of keys of corresponding value in denominational rows adjacent to the keys depressed in a preceding operation.

Figure 12:
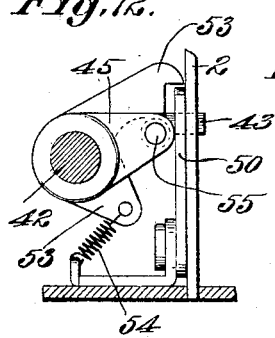
Fig. 12 is a view of the key-depressing devices in idle position when uneffected by depression of any key.
Figure 13:
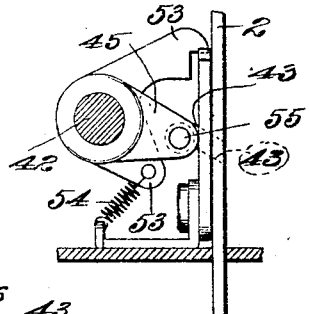
Fig. 13 is a similar view of the key-depressing devices effected by the depression of a key.
Figure 11:
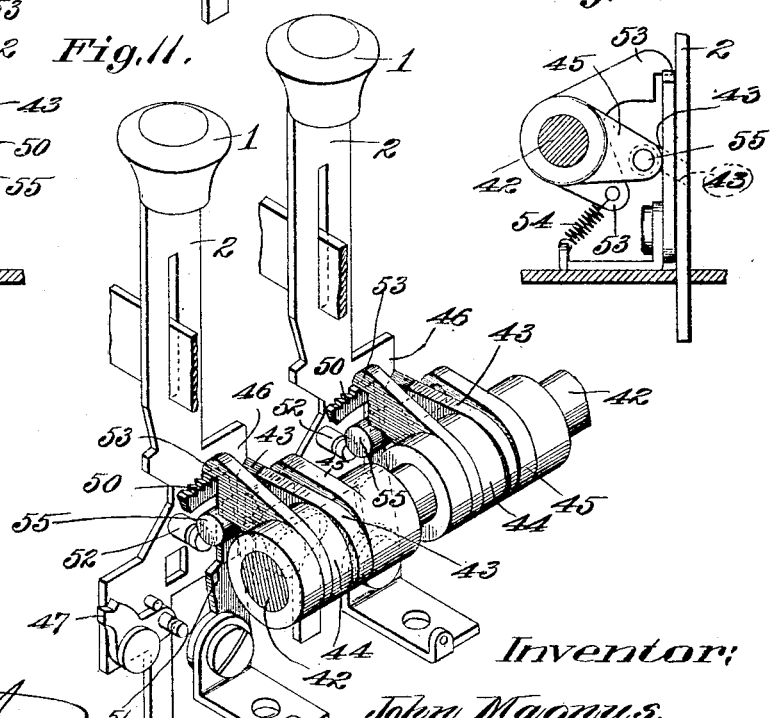
Fig. 11 is a similar perspective view illustrating the devices for effecting depression of the keys of corresponding value under control of previously depressed keys in adjacent rows.

Parallel with each transverse row of keys is a rock shaft 42. Each of the rock shafts 42 carries an arm 43 for each key stem in the row to which the rock shaft belongs. The arms 43 are laterally movable between collars 44 and arms 45 which are attached upon the rock shafts 42, but said arms 43 are not revoluble upon said shafts 42. Each key stem 2, except the stems in the highest denominational row, is formed with a cam shoulder 46 normally above the end of the adjacent arm 43; but when any key stem is depressed the cam shoulder 46 thereon pushes the adjacent arm 43 laterally over a pawl 47 pivoted upon the key stem of corresponding value in the adjacent row. The arms 43 are normally actuated away from the arm 45 and away from the pawls 47, and under the cam shoulders 46, by springs 48 supported between the arms 43 and 45, as shown in Figs. 17 and 18. Adjacent to each key stem a ratchet segment 50 (Figs. 11, 12 and 13) is pivoted, said ratchet segments being provided with oblique shoulders 51 against which the pins 52 contact when the key stems are depressed, thereby moving the ratchet segments laterally against and along with the arms 43. For each of the ratchet segments 50 there is an arm 53, said arms 53 being pivoted upon the rock shafts 42 and actuated toward the ratchet segments by springs 54. The arms 45 are provided with laterally extending pins 55 which extend under the arms 53 and normally support said arms 53 above and out of engagement with the ratchet segments 50.

From the foregoing it will be understood that when any of the numeral keys are depressed the said depressed keys position arms 43 over pawls 47 on key stems of corresponding value in adjacent rows. Therefore, it is obvious that if the shafts 42 be rocked so as to depress the arms 43 thereon, which are above the pawls 47, the key stems carrying said pawls 47 will be depressed, thereby shifting or transferring the number to adjacent orders.

Figure 1:
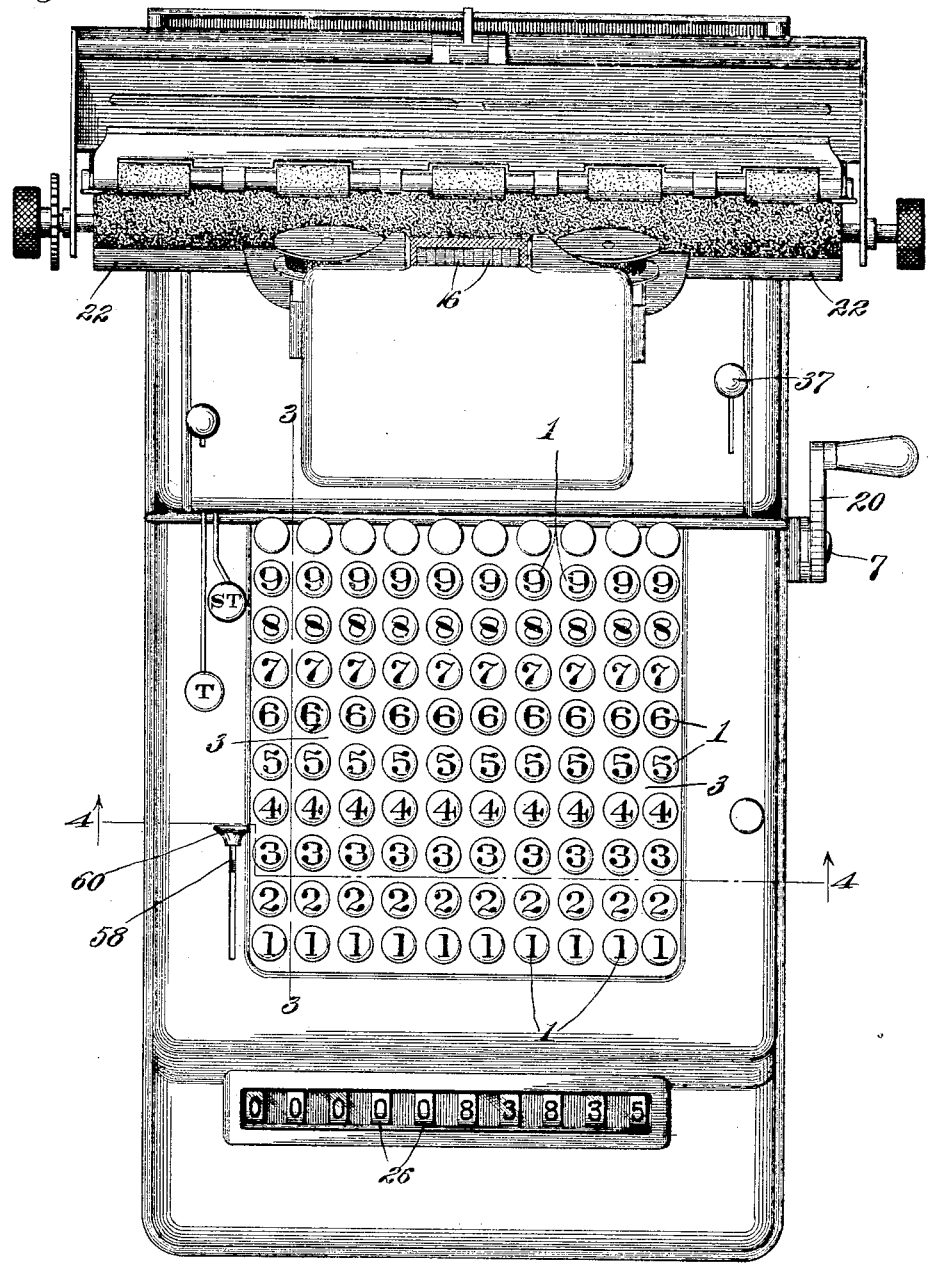
Figure 1 is a plan view of a machine of the full key-board type in which my invention is embodied.

The ends of the shafts 42 carry arms 56 (Figs. 6 and 16) and said arms are connected by a link 57. One of the arms 56 is extended upwardly to form a lever 58, whereby all of the shafts 42 may be rocked in order to depress keys corresponding in value to keys depressed in a preceding operation as above described. The lever 58 is actuated rearwardly by a spring 59 which yieldingly holds all of the shafts 42 and the parts carried by said shafts in idle position. A finger piece 60 (Fig. 1) is mounted on the upper end of the lever 58 for convenience in manipulation, and full stroke of the lever 58 is required in every operation thereof. A notched plate 61 (Fig. 6) is engaged by a pawl 62 which will prevent return of the lever 58 until said lever has been moved a distance sufficient to permit the pawl 62 to escape above the upper edge of the plate 61.

When the lever 58 and the connections controlled thereby are operated to press keys corresponding in value to the keys which had been previously depressed, it is necessary that the keys which had been previously depressed be released and permitted to return to idle position except those that may be required in the number as it is reset on the keyboard. The release of the keys for this purpose is effected by operation of the plate 29, which in turn operates the bars 6 to release the latches 5 from the depressed key stems. A bell-crank lever 63 has one arm extending through a slot in the plate 29 and the other arm extending under a lever 64 (Figs. 6, 7 and 8) which is pivoted at the side of the keyboard. A pawl 65 is pivoted near the front end of the lever 64 and has a horizontal arm extending above a pin 66 on the lever 64 (Fig. 9) and is yieldingly maintained in such adjustment by a spring 67. The depending arm of the lever 65 is normally over a projection 68 on an arm 69 which is attached to one of the rock shafts 42. By these connections operation of the lever 58 and the key-depressing means controlled thereby also operates the lever 64 and the lever 63, and thereby the plate 29, to effect the release of the keys which had been previously depressed, and at the same time effects depression of keys of corresponding value to those previously depressed, in adjacent rows. Near the extreme upward movement of the arm 69 the projection 68 moves from under the lower end of the lever 65 and thereby releases the lever 64, and the key-latching means which had been operated by said lever 64 to release the keys. When the lever 64 is released by movement of the projection 68 from under the lever 65, as aforesaid, the springs 28 (Fig. 8) actuate the bars 6, to engage latches 5 with the keys which had been depressed by operation of the lever 58 and the depressing means actuated thereby. This operation of stepping the number from order to order may be repeated as frequently as desired, and the number may be added in the different orders to which it is stepped or set, in order to complete the multiplication, or other mathematical calculations desired.

The specific mechanism above described is operable to step the number from lower to higher orders on the keyboard, but it is obvious that the mechanism is also adapted for reverse operation, that is, for stepping the number from higher to lower order. In Figs. 14 to 16, inclusive, and in Fig. 18, the mechanism for stepping the number from higher to lower orders is illustrated. It is obvious from this illustration that the embodiment of the mechanism for stepping the number from higher to lower orders requires only a reversal of the position and operation of the key-depressing means with respect to the key stems. In Figs. 14 and 15 the mechanism for stepping the numbers from lower to higher orders is illustrated and the parts are designated by the reference numerals previously referred to, and below said mechanism is illustrated the mechanism for stepping the numbers from higher to lower orders. As shown, the mechanism for stepping the numbers from higher to lower orders includes rock shafts 142 similar to the rock shafts 42; and said shafts 142 support the movable arms 143, similar to the arms 43, and mounted between the collars 144 and the arms 145, in a manner similar to the arrangement of the arms 43. The key stems also have shoulders 146, on the sides opposite from the shoulders 46, and support pawls 147, to be engaged by the arms 143 to effect depression of the keys, in the manner described in connection with the arms 43 and the pawls 47. The springs 148 operate in a manner similar to the springs 48, and there are ratchet segments 150, provided with shoulders 151 to be engaged by pins 152 on the key stems, in a manner similar to the operation of like parts upon the ratchet segments 50. There are arms 153 to engage with and latch the ratchet segments and actuated by springs 154 in a manner similar to the actuation of the arms 53 to engage the ratchet segments 50, and there are laterally extending pins 155 for the same purpose as the pins 55.

The ends of the shafts 142 carry arms 156 which are connected by a link 157, one of said arms 156 being extended upwardly to form a lever 158, whereby all of the shafts 142 may be rocked in order to depress keys corresponding in value to the keys depressed in a preceding operation as hereinbefore described. The lever 158 is actuated rearwardly by a spring 159, which yieldingly holds all of the shafts 142 and the parts carried by said shafts in idle position. A finger piece 160 is connected to the upper end of the lever 158 for convenience in manipulation, and full stroke devices comprising the plate 161 and the pawl 162 is provided for the lever 158.

Figure 10:
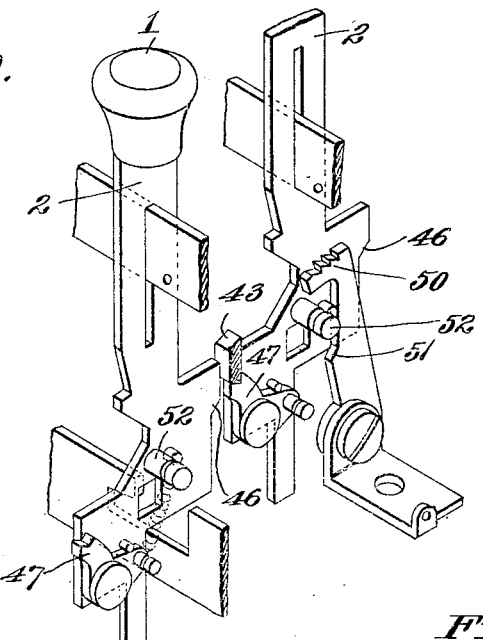
Fig. 10 is a perspective view of two key-stems of corresponding value in adjacent rows, illustrating certain of the features included in my invention whereby depression of one of said keys actuates means for effecting depression of the other of said keys at the will of and at a time to be determined by the operator.

A lever 164, similar to the lever 64, has one end extending over the horizontal arm of the lever 63 (Fig. 10), and supports a pawl 165, a pin 166, and a spring 167, similar to the pawl 65, the pin 66 and the spring 67, which are carried by the lever 64. The pawl 165 coöperates with a pin 168 on an arm 169, similar to the coöperation of the pawl 65 with the pin 68 and the arm 69, and for similar purposes.

From the foregoing it will be understood that the devices positioned by the keys, and subsequently operable by the lever 58, will step or re-set the number toward higher orders by depressing keys in higher orders of corresponding value to the keys previously depressed in lower orders. It is further apparent that the connections operated by the lever 158 will step or re-set the number toward lower orders by depressing keys in lower orders of corresponding value to previously depressed keys in rows of higher orders. Therefore, by the use of these devices the number may be stepped or re-set in either direction on the key-board so as to increase or reduce the value of the number.

I am aware that there may be many modifications in the construction and arrangement of the mechanism without departure from the spirit or scope of the invention and I do not restrict myself to specific features, but what I claim and desire to secure by Letters Patent is:

1. In a machine of the character described, the combination with rows of depressible number keys, elements normally in inoperative position and movable to operative position for effecting depression of keys in one row of corresponding value to previously depressed keys in an adjacent row, means for setting said elements in operative position by operation of said previously depressed keys, latching devices retaining said elements in operative position independently of the previously depressed keys, and means for actuating said elements to effect depression of keys.

2. In an adding machine, the combination with rows of depressible keys, appliances for effecting depression of a key in one row moved to operative position by keys of corresponding value in an adjacent row depressed in a preceding operation, actuators for moving said appliances to and normally holding them in inoperative positions, latching devices holding said appliances in operative position independently of the previously depressed keys, and a manipulative device for actuating said appliances.

3. In a machine of the character described, the combination with denominational rows of number keys, of means for operating a key in one row under control of a previously operated key of corresponding value in an adjacent row, actuators for moving said means to and holding said means normally in inoperative positions, automatic devices for holding said means in operative positions independently of the previously depressed keys, a manipulative device for actuating said means to effect depression of keys, and means for restoring to idle position keys controlled by said means.

4. In a machine of the character described the combination with denominational rows of number keys, of means for operating a key in one row under control of a previously depressed key of corresponding value in an adjacent row and latching devices positively preventing disengagement of said operating means from the keys being operated by said means.

5. In a machine of the character described, the combination with rows of depressible keys, levers for effecting depression of keys in one row under control of keys in an adjacent row, means normally holding said levers out of operative positions, means actuated by keys as an incident to depression thereof for moving said levers to operative position for depression of keys of corresponding value in adjacent rows, automatic means for holding said levers in operative position independently of the previously depressed keys, and means for releasing said automatic means to enable said levers to be restored to inoperative positions.

6. In an adding machine, the combination with rows of depressible keys, levers for effecting depression of keys in one row under control of keys in an adjacent row, actuators for said levers normally holding them in inoperative positions, means for engaging said levers with the keys to be depressed thereby by operation of the previously depressed keys, automatic means for holding said levers in engagement with the keys to be depressed thereby independently of the previously depressed keys, and manipulative means for operating said levers.

7. In an adding machine, the combination with rows of depressible keys, of levers for depressing keys in one row under control of previously depressed keys of corresponding value in an adjacent row, means normally holding said levers in inoperative positions and being operable to restore said levers to inoperative positions, parts controlled by the keys as an incident to depression thereof for moving corresponding levers into operative position relative to keys of corresponding value in adjacent rows, automatic devices for holding said levers in the operative positions aforesaid independently of the keys which had moved said levers to said positions, manipulative means for operating said levers to effect depression of the keys engaged thereby, and means for disengaging said levers from said keys.

8. In an adding machine, the combination with depressible numerical keys arranged in denominational rows, rocking levers for operating keys in one row under control of previously operated keys of corresponding numerical value, means normally holding said levers in inoperative positions, means for moving levers to operative positions as an incident to depression of keys of corresponding numerical value, manipulative means for rocking said levers after they have been moved to operative positions, automatic devices for holding said levers in operative positions independently of the previously depressed keys, and automatic means for disengaging said levers from the keys engaged thereby.

9. In an adding machine, the combination with rows of depressible keys, of supports, levers carried by said supports for sliding and rocking movements, means normally holding said levers in retracted positions, means under control of keys in the several rows for sliding said levers to operative positions to engage keys of corresponding numerical values in adjacent rows, means for rocking said levers to depress the keys of corresponding numerical value, means holding said levers from retraction independently of the keys which had moved them from retracted positions, and automatic means for disengaging said levers from the keys after depression of said keys.

10. In a machine of the character described, the combination with denominational rows of number keys, of means for operating keys in one row under control of previously operated keys of corresponding value in an adjacent row of higher denominational value, and means for operating keys in another row, of lower denominational value, also under control of said previously operated keys.

11. In an adding machine, the combination with rows of depressible keys, of mechanism for effecting depression of keys in one row under control of previously depressed keys of corresponding value in an adjacent row of lower denominational value depressed in a preceding operation, and independent means for effecting depression of keys in another row, of lower denominational value, also under control of said previously depressed keys.

12. In a machine of the character described, the combination with denominational rows of number keys, of rock shafts, means carried by said rock shafts for effecting depression of keys in one row under control of previously depressed keys of corresponding value in an adjacent row depressed in a preceding operation, latching means preventing accidental disengagement of said depressing means from said keys during operation of said depressing means, and automatic means for disengaging said depressing means from said keys after operation of said depressing means.

13. In an adding machine, the combination with rows of depressible keys, of mechanism for effecting depression of a key in one row under control of a previously depressed key of corresponding value in an adjacent row depressed in a preceding operation, a latching element for said means, and means for actuating said latching element by the depression of the previously depressed key.

14. In a machine of the character described, the combination with rows of depressible keys, devices for effecting depression of a key in one row under control of a previously depressed key of corresponding value in an adjacent row depressed in a preceding operation, elements for latching said devices in position for effecting depression of the key to be depressed thereby, and means controlled by the previously depressed key for setting said latching elements in position to latch said devices.

In testimony whereof, I have signed my name to this specification in the presence of two subscribing witnesses.

JOHN MAGNUS.

In the presence of:—
BARNEY DYSART,
R. D. BRYANS.